(12) United States Patent
Ueyama et al.

(10) Patent No.: US 9,685,838 B2
(45) Date of Patent: Jun. 20, 2017

(54) ELECTROMECHANICAL ACTUATOR

(71) Applicant: NABTESCO CORPORATION, Tokyo (JP)

(72) Inventors: Masayoshi Ueyama, Fuwa-gun (JP); Ryoichi Higuchi, Fuwa-gun (JP)

(73) Assignee: NABTESCO CORPORATION, Tokyo (JP)

( * ) Notice: Subject to any disclaimer, the term of this patent is extended or adjusted under 35 U.S.C. 154(b) by 456 days.

(21) Appl. No.: 14/503,830

(22) Filed: Oct. 1, 2014

(65) Prior Publication Data

US 2015/0097455 A1 Apr. 9, 2015

(30) Foreign Application Priority Data

Oct. 8, 2013 (JP) ................. 2013-210821

(51) Int. Cl.
| | | |
|---|---|---|
| H02K 7/06 | (2006.01) | |
| F16H 25/20 | (2006.01) | |
| H02K 16/02 | (2006.01) | |

(52) U.S. Cl.
CPC ............ *H02K 7/06* (2013.01); *F16H 25/205* (2013.01); *H02K 16/02* (2013.01); *F16H 2025/2078* (2013.01); *H02K 2213/06* (2013.01)

(58) Field of Classification Search
CPC .......... F16H 25/205; F16H 2025/2078; H02K 16/02; H02K 7/06; H02K 2213/06
USPC .......................................................... 310/80
See application file for complete search history.

(56) References Cited

U.S. PATENT DOCUMENTS

| | | | | | |
|---|---|---|---|---|---|
| 3,479,890 A | * | 11/1969 | Howell | ................ | B60N 2/2227 74/586 |
| 4,179,944 A | * | 12/1979 | Conner | ................... | B64C 13/42 192/141 |
| 4,876,906 A | * | 10/1989 | Jones | ...................... | B64C 13/42 244/99.9 |
| 5,214,972 A | * | 6/1993 | Larson | ................... | B64C 13/34 244/99.9 |
| 6,928,895 B2 | * | 8/2005 | Davies | ...................... | B64C 9/02 49/139 |
| 7,190,096 B2 | * | 3/2007 | Blanding | ................ | B64C 13/00 310/112 |
| 8,266,976 B2 | * | 9/2012 | Waide | ................. | F16H 25/2252 74/424.92 |
| 2006/0138281 A1 | * | 6/2006 | Barba | ................... | B64C 1/1407 244/129.5 |

(Continued)

*Primary Examiner* — Alex W Mok
(74) *Attorney, Agent, or Firm* — Studebaker & Brackett PC (57) ABSTRACT

An electromechanical actuator is provided whose structure is simplified and made small, and with which an output portion can be driven even if a jammed state occurs in a screw mechanism. An electromechanical actuator is configured that includes an electric motor having a first rotor portion and a second rotor portion capable of relative rotation with respect to each other, and a jam relief mechanism having a first conversion portion having a first screw mechanism capable of converting rotational force of the first rotor portion into thrust force and moving an output portion back and forth, a sliding support mechanism which can transmit the rotational force of the first rotor portion to the first conversion portion, and a second conversion portion having a second screw mechanism which moves the output portion back and forth together with the first conversion portion.

8 Claims, 5 Drawing Sheets

(56) References Cited

U.S. PATENT DOCUMENTS

| | | | |
|---|---|---|---|
| 2006/0266146 A1* | 11/2006 | Waide | F16H 25/2252 74/424.92 |
| 2010/0242643 A1* | 9/2010 | Waide | F16H 25/2252 74/89.26 |
| 2011/0193300 A1* | 8/2011 | Oteman | B60G 13/001 280/5.5 |
| 2014/0049140 A1* | 2/2014 | Wakita | B64C 13/28 310/75 R |

* cited by examiner

ELECTROMECHANICAL ACTUATOR

CROSS-REFERENCE TO RELATED APPLICATION

This application is based upon and claims the benefit of priority from Japanese patent application No. 2013-210821, the disclosure of which is herein incorporated by reference in its entirety.

BACKGROUND OF THE INVENTION

1. Field of the Invention

The present invention relates to an electromechanical actuator that has a screw mechanism, converts rotational driving force which is output by an electric motor into linear driving force, and outputs the converted driving force.

2. Description of the Related Art

Conventionally, an electromechanical actuator having an electric motor and a screw mechanism has been used in various fields such as the field of aircrafts. This electromechanical actuator converts rotational driving force that is output by the electric motor into linear driving force and outputs the converted driving force, using the screw mechanism. The electromechanical actuator drives various kinds of equipment by an output portion being displaced so as to extend and retract in a linear direction with respect to a housing. Note that the aforementioned electromechanical actuator has an advantage of a smaller maintenance burden than that of a hydraulic actuator that operates by pressure oil being supplied thereto.

With the aforementioned electromechanical actuator, a jammed state may occur in the screw mechanism due to causes such as prying or seizure. If a jammed state occurs in the electromechanical actuator, it becomes difficult to move the output portion back and forth with respect to the housing.

U.S. Pat. No. 5,214,972 discloses an electromechanical actuator provided with a first actuator and a second actuator. The first actuator and the second actuator are installed so as to coaxially extend in opposite directions. The first actuator and the second actuator each include an electric motor and a ball screw mechanism. In the electromechanical actuator having this configuration, even if a jammed state occurs in the screw mechanism in one of the first and second actuators, the other of the first and second actuators is in an operable state. For this reason, in this electromechanical actuator, even if the aforementioned jammed state occurs, the output portion can be withdrawn to a position at which the output portion is retracted with respect to the housing.

SUMMARY OF THE INVENTION

However, the electromechanical actuator disclosed in U.S. Pat. No. 5,214,972 needs dual actuators that are provided so as to coaxially extend in opposite directions. Furthermore, the two actuators each need an electric motor and a screw mechanism. For this reason, the structure of this electromechanical actuator will become complicated and large. The weight of the electromechanical actuator will also increase with an increase in the size of the structure.

The present invention is for solving the foregoing problem, and an object thereof is to provide an electromechanical actuator whose structure is simplified and made small, and in which, even if a jammed state occurs in one screw mechanism, the other screw mechanism can move an output portion back and forth with respect to a housing.

(1) In order to solve the above-described problem, an electromechanical actuator according to an aspect of the present invention is an electromechanical actuator including: an electric motor having a first rotor portion and a second rotor portion that serve as a pair of rotor portions, which are each formed in a cylindrical shape, are arranged within a cylindrical stator fixed to a housing, in an axial direction of the stator, and can relatively rotate with respect to each other; an output portion that outputs driving force; and a jam relief mechanism having a first conversion portion that has a first screw mechanism capable of converting rotational force of the first rotor portion into thrust force and moving the output portion back and forth, a sliding support mechanism provided between the first rotor portion and the first conversion portion, the sliding support mechanism supporting the first conversion portion so as to be able to be displaced in an axial direction with respect to the first rotor portion and being able to transmit the rotational force of the first rotor portion to the first conversion portion, and a second conversion portion that has a second screw mechanism which converts rotational force of the second rotor portion into thrust force and moves the output portion back and forth together with the first conversion portion.

With this configuration, if the electric motor operates during normal operation, i.e., when a jammed state has not occurred in the screw mechanisms, the pair of rotor portions (the first rotor portion and the second rotor portion) are driven to rotate with respect to the common stator. That is to say, the pair of rotor portions rotate at roughly the same speed. At this time, since the rotational force of the first rotor portion is converted into thrust force and is transmitted to the output portion by the first screw mechanism, the output portion advances or withdraws in the axial direction. Note that, at this time, since the second rotor portion and the second screw mechanism rotate at roughly the same speed, the thrust force is substantially not transmitted from the second screw mechanism to the output portion.

As described above, in the electromechanical actuator during normal operation, the output portion is displaced in the axial direction substantially by the first conversion portion. Accordingly, since the first conversion portion operates for a longer time than the second conversion portion, a jammed state is more likely to occur in the first conversion portion.

In this regard, with this configuration, even if a jammed state occurs in the first screw mechanism, the output portion can be displaced in the axial direction by the second screw mechanism.

Specifically, if a jammed state occurs in the first screw mechanism, the rotational force of the first rotor portion cannot be transmitted to the output portion via the first conversion portion. However, on the other hand, the second rotor portion is rotated by the stator regardless of the rotation of the first rotor portion. Then, the rotational force of the second rotor portion is transmitted to the output portion via the second conversion portion. As a result, the output portion is moved back and forth together with the first screw mechanism in a jammed state, by the second screw mechanism.

Accordingly, with this configuration, even if the first screw mechanism that is mainly used to move the output portion back and forth during normal operation enters a jammed state, the output portion can be moved with respect to the housing by the second screw mechanism. Moreover, the structure for moving the output portion back and forth when in a jammed state as described above is realized with a relatively small and simple structure configured to include the pair of rotor portions that are provided with respect to the common stator, the first screw mechanism, the second screw mechanism, and the like. For this reason, simplification and a size reduction of the structure of the electromechanical actuator will be achieved.

Accordingly, with this configuration, it is possible to provide an electromechanical actuator whose structure is simplified and made small, and in which, even if a jammed state occurs in one of the screw mechanisms, the output portion can be moved back and forth with respect to the housing by the other screw mechanism.

(2) Preferably, the electromechanical actuator further includes a rotation member that can move the output portion back and forth by rotating together with the first rotor portion, and can also move the output portion back and forth together with the first conversion portion by the second rotor portion rotating, wherein the rotation member has a sliding portion that is accommodated in the first rotor portion so as to be coaxial with the first rotor portion, the sliding portion being unable to rotate with respect to the first rotor portion and being able to slide in the axial direction by means of the sliding support mechanism.

With this configuration, when the electric motor operates during normal operation, the rotation member can be rotated by the first rotor portion. The rotational force of the rotation member that is thus rotated is converted into thrust force by the first conversion portion, and moves the output portion back and forth. Furthermore, with this configuration, if a jammed state occurs in the first screw mechanism, the rotation member can be moved in a sliding manner in the axial direction by the rotation of the second rotor portion, and the output portion can be moved back and forth together with the rotation member.

(3) More preferably, the rotation member is provided with a second screw portion that is integrated with the sliding portion so as to be coaxial with the sliding portion, can relatively rotate with respect to a first screw portion formed in an inner circumferential portion of the second rotor portion, around an axis of the first screw portion, and can be relatively displaced in the axial direction with respect to the first screw portion, and the second screw mechanism has the first screw portion and the second screw portion.

With this configuration, since the second screw mechanism can be constituted by using two screw portions (the first screw portion and the second screw portion), a specific configuration of the second screw mechanism can be provided.

(4) Preferably, the first screw mechanism has a third screw portion in which a screw channel is formed, and a fourth screw portion to which the output portion is connected or in which the output portion is provided, the fourth screw portion being attached so as to be able to relatively rotate around an axis of the third screw portion and being able to be relatively displaced in the axial direction with respect to the third screw portion.

With this configuration, since the first screw mechanism can be constituted by using two screw portions (the third screw portion and the fourth screw portion), a specific configuration of the first screw mechanism can be provided.

(5) Preferably, the electromechanical actuator further includes a bearing portion that is provided between the pair of rotor portions and allows the pair of rotor portions to rotate with respect to each other.

With this configuration, as a result of provision of the bearing portion between the pair of rotor portions that are arranged in series, the pair of rotor portions can be appropriately supported with respect to each other such that the pair of rotor portions can rotate with respect to each other.

(6) Preferably, the rotation member is formed in a cylindrical shape, and the fourth screw portion is accommodated within the rotation member.

With this configuration, since the fourth screw portion can be accommodated within the rotation member, the size of the electromechanical actuator can be further reduced.

(7) More preferably, the fourth screw portion is arranged radially inward of the sliding portion.

With this configuration, since the sliding portion and the fourth screw portion can be arranged so as to be aligned in the axial direction, the axial length of the electromechanical actuator can be reduced.

(8) Preferably, the output portion is provided with a connected portion with which rotation of the output portion with respect to the housing is restricted by the connected portion being connected to equipment driven by the driving force that is output by the output portion.

With this configuration, the output portion can be linearly moved without providing a mechanism necessary for linearly moving the output portion with respect to the housing (i.e., a mechanism for supporting the output portion so as not to be able to rotate with respect to the housing and so as to be able to slide in the axial direction.)

Note that the above and other objects, features, and advantages of the present invention will become apparent by reading the following description with the attached drawings.

DETAILED DESCRIPTION OF THE INVENTION

Hereinafter, a mode for carrying out the present invention will be described with reference to the drawings. In the following embodiment, an exemplary mode will be described in which an electromechanical actuator is provided in a moving surface drive mechanism for driving a moving surface of an aircraft. However, the present invention is not limited to the exemplary mode described in the following embodiment, and is widely applicable. Specifically, the present invention is widely applicable to an electromechanical actuator that has a screw mechanism, converts rotational driving force which is output by an electric motor into linear driving force and outputs the converted driving force.

Figure 1:
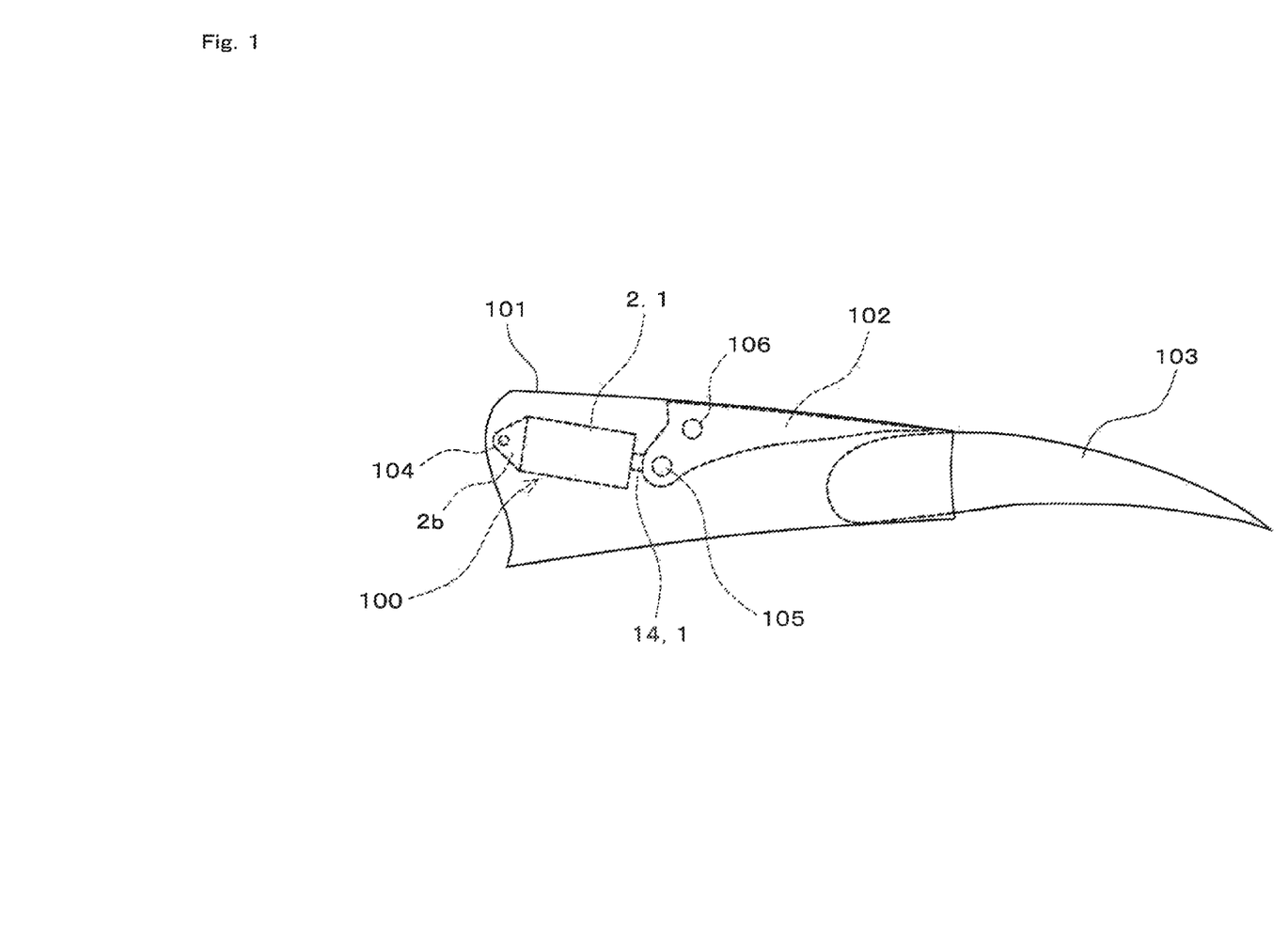
FIG. 1 is a schematic view showing a state where an electromechanical actuator according to an embodiment of the present invention is attached to a wing and a moving surface of an aircraft.

FIG. 1 is a schematic view showing an exemplary state where an electromechanical actuator 1 according to an embodiment of the present invention is attached to a wing 101 and a moving surface 102 of an aircraft. FIG. 1 omits the main part of the aircraft. FIG. 1 schematically shows a part of the wing 101, the moving surface 102, and a moving surface 103. In the present embodiment, the wing 101 is configured as a main wing of the aircraft. The moving surface 102 is configured as a spoiler. In the present embodiment, the moving surface 102 is configured as equipment driven by the electromechanical actuator 1. The moving surface 103 is configured as a flap Note that FIG. 1 schematically shows a state where a rear-end portion of the wing 101 is seen in the left-right direction of the aircraft. FIG. 1 also schematically shows only outlines of the wing 101 and the moving surfaces 102 and 103.

Moving Surface Drive Mechanism

Prior to the description of the electromechanical actuator 1, an aircraft moving surface drive mechanism 100, which is an example to which the electromechanical actuator 1 is applied, will be described first. The moving surface drive mechanism 100 shown in FIG. 1 is installed in the wing 101 of the aircraft. The moving surface drive mechanism 100 is used for driving the moving surface 102 of the aircraft. The moving surface drive mechanism 100 is configured to include the electromechanical actuator 1, a rotary shaft 104, and a pivot shaft 105.

The rotary shaft 104 is installed in the wing 101. An end portion of a housing 2 of the electromechanical actuator 1 is rotatably connected to the rotary shaft 104. The electromechanical actuator 1 is thereby supported so as to be able to pivot around the rotary shaft 104 with respect to the wing 101.

The pivot shaft 105 is installed in the moving surface 102. An end portion of an output portion connected to a fourth screw portion 14 of the electromechanical actuator 1 is rotatably connected to the moving surface 102. Note that the moving surface 102 is rotatably supported with respect to a fulcrum shaft 106. The fulcrum shaft 106 is installed in the wing 101. The moving surface 102 is thereby supported so as to be able to pivot around the fulcrum shaft 106 with respect to the wing 101.

In the electromechanical actuator 1, the fourth screw portion 14 to which the output portion is connected on the tip side is provided so as to be able to protrude and be relatively displaced with respect to the housing 2. That is to say, the fourth screw portion 14 is configured to be capable of an operation of extending from the housing 2 by protruding from the housing 2. Furthermore, the fourth screw portion 14 is also configured to be capable of an operation of retracting with respect to the housing 2.

Figure 2:
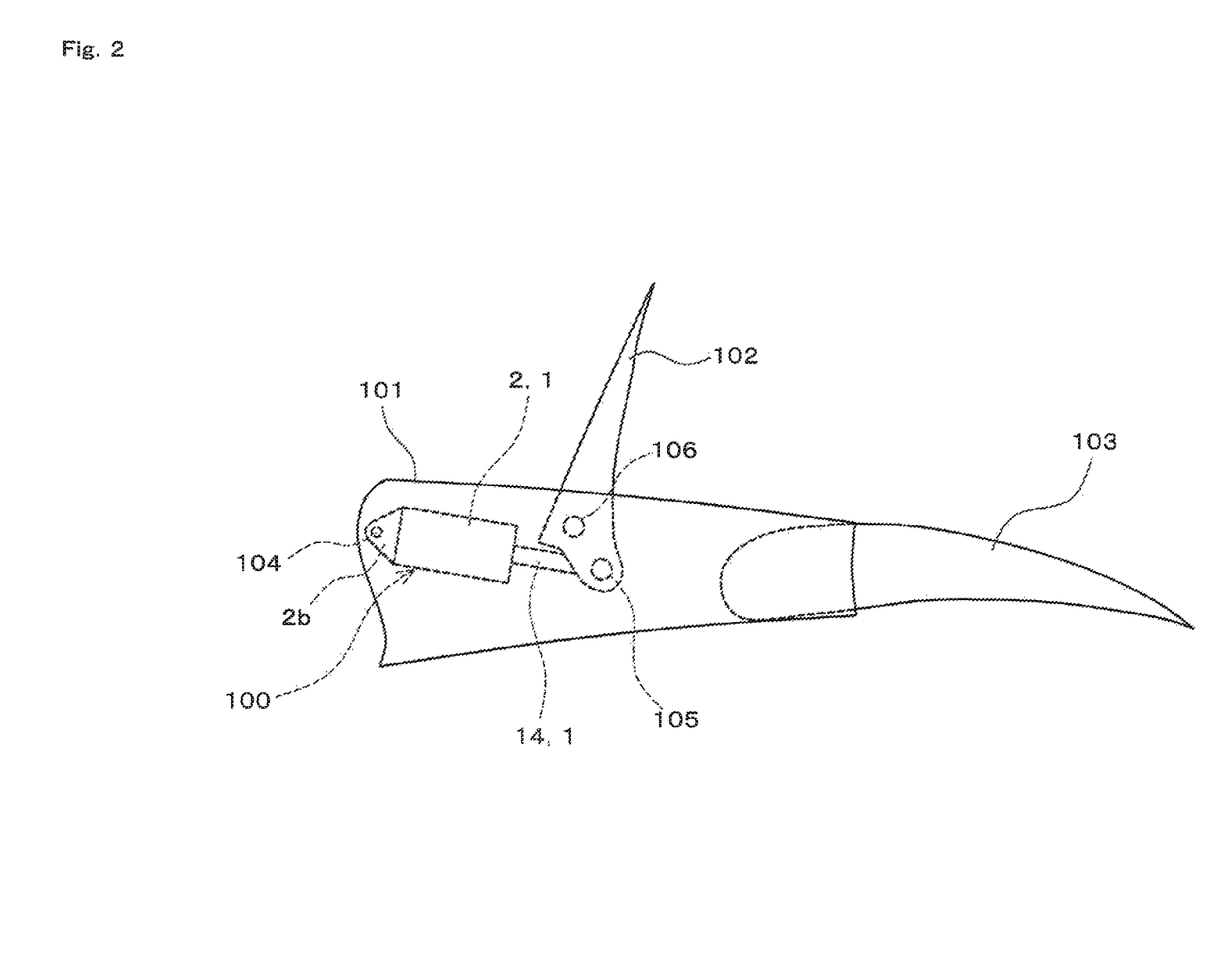
FIG. 2 is a schematic view showing a state where the moving surface is driven from the state shown in FIG. 1 by the electromechanical actuator.

FIG. 2 is a schematic view showing a state where the moving surface 102 is driven from the state shown in FIG. 1 by the electromechanical actuator 1 in the moving surface drive mechanism 100. FIG. 1 shows a state where the fourth screw portion 14 has withdrawn to the position where the fourth screw portion 14 is fully withdrawn with respect to the housing 2. On the other hand, FIG. 2 shows a state where the fourth screw portion 14 protrudes and extends from housing 2. As shown in FIGS. 1 and 2, the moving surface 102 is driven by the electromechanical actuator 1 operating. The moving surface 102 is driven so as to pivot around the fulcrum shaft 106 with respect to the wing 101.

Note that the moving surface drive mechanism 100 shown in FIG. 1 may further be provided with a reaction link. The reaction link is provided as a member that, when the output from the electromechanical actuator 1 is given to the moving surface 102, supports the reaction force from the moving surface 102 generated by this output. One end portion of the reaction link is connected to the rotary shaft 104, and the other end portion is connected to the fulcrum shaft 106. As a result of provision of the reaction link, the influence of a load received by the moving surface 102, which is movable, being directly exerted on the wing 101, which is fixed, is suppressed.

Configuration

Figure 3:
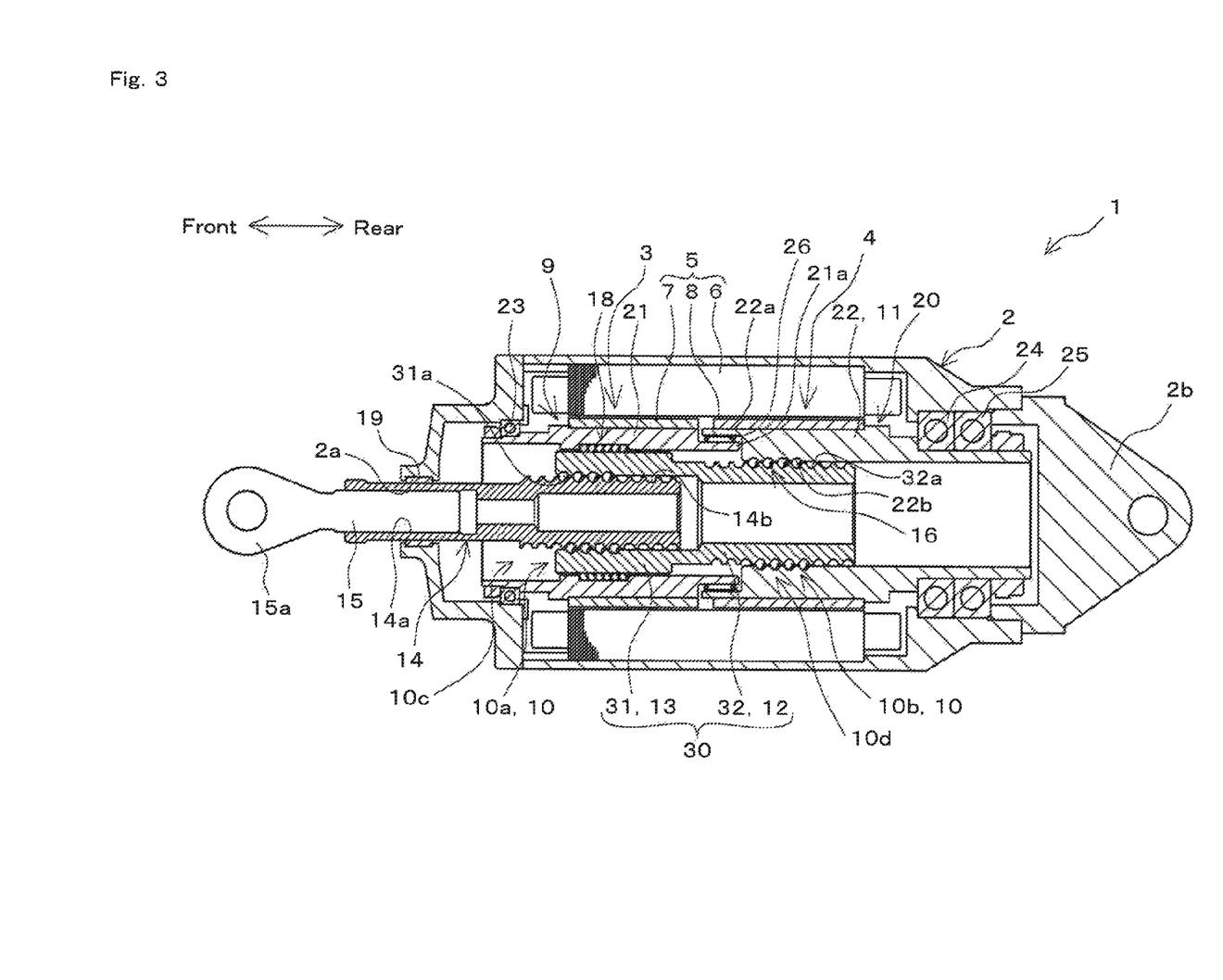
FIG. 3 is a cross-sectional view schematically showing a configuration of the electromechanical actuator according to an embodiment of the present invention.

FIG. 3 is a diagram schematically showing the electromechanical actuator 1, and includes a partial cross-section of the electromechanical actuator 1. As mentioned above, the electromechanical actuator 1 is configured as an actuator that drives the moving surface 102. As shown in FIG. 3, the electromechanical actuator 1 is configured to include the housing 2, a screw mechanism 10 having first to fourth screw portions 11, 12, 13, and 14, an electric motor 5, a plurality of cylindrical members, a plurality of bearings, and the like. Note that, in the diagrams, the direction indicated by the arrow denoted as "front" will be referred to as the front side or front direction, and the direction indicated by the arrow denoted as "rear" will be referred to as the rear side or rear direction, for the sake of convenience of the description.

The housing 2 is provided as a structure having an internal space. The housing 2 is configured to have a substantially cylindrical shape as a result of a plurality of members being combined. The housing 2 accommodates the screw mechanism 10, the electric motor 5, and the like. An opening portion 2a is formed on one side (front side in FIG. 3) of the housing 2. The fourth screw portion 14 of the screw mechanism 10 is inserted into the opening portion 2a via a loop-shaped seal member 19. An end portion 2b of the housing 2 on the other side (rear side in FIG. 3) is pivotably connected to the wing 101 via the rotary shaft 104 (see FIGS. 1 and 2).

The electric motor 5 is for driving the screw mechanism 10. In the present embodiment, the electric motor 5 is used as a driving source for driving the moving surface 102, which is equipment having a relatively large weight. Accordingly, a motor having a relatively high rated voltage (e.g., a motor having a rated voltage of 270 V) is used as the electric motor 5.

The electric motor 5 has a stator 6 that is formed in a substantially tubular shape, and a pair of rotors 7 and 8 that are accommodated within the stator 6. That is to say, the electric motor 5 is constituted by a so-called inner-rotor electric motor in which the rotors 7 and 8 are accommodated within the stator 6.

The stator 6 is fixed to the inner circumferential face of the housing 2, while being accommodated in the housing 2 so as to be coaxial with the housing 2.

The pair of rotors 7 and 8 are constituted by a first rotor 7 and a second rotor 8, respectively. The rotors 7 and 8 are each formed in a substantially cylindrical shape, and are accommodated in the stator 6, while being spaced apart from the stator 6 in the radial direction. The first rotor 7 and the second rotor 8 are arranged in the axial direction so as to be coaxial with the stator 6, and so as to be spaced apart from each other. A first cylindrical member 21 (tubular member) is fixed to the inner circumferential face of the first rotor 7. On the other hand, a second cylindrical member 22 (tubular member) is fixed to the inner circumferential face of the second rotor 8. Note that, in the present embodiment, a first rotor portion 3 is constituted by the first rotor 7 and the first cylindrical member 21, and a second rotor portion 4 is constituted by the second rotor 8 and the second cylindrical member 22.

The electric motor 5 is configured such that the rotors 7 and 8 rotate due to a rotating magnetic field generated inside the stator 6 by the current that flows through winding (not shown) that is wound around the stator 6.

The first cylindrical member 21 and the second cylindrical member 22 are provided as a pair of cylindrical members 20 (a pair of tubular members). The cylindrical members 21 and 22 are each formed in a substantially cylindrical shape. The pair of cylindrical members 20 are provided as outer cylindrical members that accommodate an inner cylindrical member 30 (rotation member), the details of which will be described later.

The first cylindrical member 21 is accommodated in a front space in the housing 2. A front end portion of the first cylindrical member 21 is rotatably attached to the housing 2 via a bearing 23. A rear end portion of the first cylindrical member 21 is provided as a cylindrical extending portion 21a whose outside diameter is smaller than an axially intermediate portion of the first cylindrical member 21.

The second cylindrical member 22 is accommodated in a rear space in the housing 2. A rear end portion of the second cylindrical member 22 is rotatably attached to the housing 2 via a pair of bearings 24 and 25. The pair of bearings 24 and 25 are arranged so as to be adjacent to each other in the axial direction of the second cylindrical member 22. A screw channel 22b having a helical shape is formed in a front part of the inner circumferential face of the second cylindrical member 22. A front end portion of the second cylindrical member 22 is provided as a cylindrical extending portion 22a whose inside diameter is larger than an axially intermediate portion of the second cylindrical member 22. The inside diameter of the extending portion 22a of the second cylindrical member 22 is larger than the outside diameter of the extending portion 21a of the first cylindrical member 21.

The first cylindrical member 21 and the second cylindrical member 22 are arranged with respect to each other such that the extending portions 21a and 22a of the respective cylindrical members 21 and 22 overlap each other in the axial direction. A gap is thereby formed in the radial direction between the extending portion 21a and the extending portion 22a. A bearing 26 is provided in this gap. This bearing 26 is for allowing rotation of the pair of cylindrical members 21 and 22 with respect to each other, and is constituted by a needle bearing, for example. Also, the first cylindrical member 21 and the second cylindrical member 22 are arranged with respect to each other such that a gap is formed between an extending end portion of the extending portion 21a and the cylindrical member 22 and between an extending end portion of the extending portion 22a and the cylindrical member 21.

The inner cylindrical member 30 is a member formed in a substantially cylindrical shape, and is accommodated within the pair of cylindrical members 20 so as to be coaxial with the pair of cylindrical members 20. The inner cylindrical member 30 has a front portion 31 (a sliding portion, the third screw portion) and a rear portion 32 (the second screw portion), which are integrally formed.

The front portion 31 constitutes a front part of the inner cylindrical member 30. The front portion 31 is accommodated in the first cylindrical member 21. A screw channel 31a having a helical shape is formed in a front part of the inner circumferential face of the front portion 31. A ball spline mechanism 18 is provided between the outer circumferential face of the front portion 31 and the first cylindrical member 21. This ball spline mechanism 18 is provided as a sliding support mechanism that supports the inner cylindrical member 30 so as not to be able to rotate with respect to the first cylindrical member 21 and so as to be able to be displaced in the front-rear direction (axial direction).

Note that the aforementioned sliding support mechanism may be constituted by a mechanism other than the ball spline mechanism 18 as long as the mechanism supports the inner cylindrical member 30 so as not to be able to rotate with respect to the first cylindrical member 21 and so as to be able to be displaced in the front-rear direction. For example, the sliding support mechanism may be constituted by a spline mechanism. As another example, the sliding support mechanism may be constituted by a whirl-stop that prevents the inner cylindrical member from rotating with respect to the first cylindrical member, and a plain bearing that supports the inner cylindrical member so as to be able to be displaced in the axial direction with respect to the first cylindrical member.

The rear portion 32 constitutes a rear part of the inner cylindrical member 30. The rear portion 32 is accommodated in the second cylindrical member 22. A screw channel 32a having a helical shape is formed in the outer circumferential face of the rear portion 32.

The fourth screw portion 14 is a member formed in a substantially bar-like shape. A rear part of the fourth screw portion 14 is inserted into the front portion 31 of the inner cylindrical member 30 so as to be coaxial with the front portion 31. The fourth screw portion 14 has a through hole 14a that penetrates the fourth screw portion 14 in the axial direction. The output portion 15 is inserted into and fixed to a front part of the through hole 14a. A screw channel 14b having a helical shape is formed in a rear part of the outer circumferential face of the fourth screw portion 14. The fourth screw portion 14 is arranged radially inward of the ball spline mechanism 18.

Configuration of Screw Mechanism

The screw mechanism 10 is provided as a mechanism that converts rotational driving force which is output by the electric motor 5 into linear driving force and outputs the converted driving force. The screw mechanism 10 includes a first screw mechanism 10a and a second screw mechanism 10b. The first screw mechanism 10a and the second screw mechanism 10b are provided as a first conversion portion 10c and a second conversion portion 10d, respectively. Note that the electromechanical actuator 1 according to the present embodiment includes a jam relief mechanism 9 having the first conversion portion 10c, the second conversion portion 10d, and the aforementioned ball spline mechanism 18 serving as a sliding support mechanism.

The second screw mechanism 10b includes the first screw portion 11, the second screw portion 12, and a first ball group 16.

The first screw portion 11 is configured as the aforementioned second cylindrical member 22. The second screw portion 12 is configured as the aforementioned rear portion 32 of the inner cylindrical member 30. The first ball group 16 is constituted by a plurality of balls. The first ball group 16 is provided between the screw channel 22b of the first screw portion 11 (i.e., the second cylindrical member 22) and the screw channel 32a of the second screw portion 12 (i.e., the rear portion 32). The first ball group 16 circulates in these two channels 22b and 32a. That is to say, the second screw mechanism 10b is configured as a ball screw mechanism.

The first screw mechanism 10a includes the third screw portion 13, the aforementioned fourth screw portion 14, and a second ball group 17.

The third screw portion 13 is configured as the aforementioned front portion 31 of the inner cylindrical member 30.

The second ball group 17 is constituted by a plurality of balls. The second ball group 17 is provided between the screw channel 31a of the third screw portion 13 (i.e., the front portion 31) and the screw channel 14b of the fourth screw portion 14. The second ball group 17 circulates in these two channels 31a and 14b. That is to say, the second screw mechanism 10b is configured as a ball screw mechanism.

Basic Operation of Electromechanical Actuator

Figure 4:
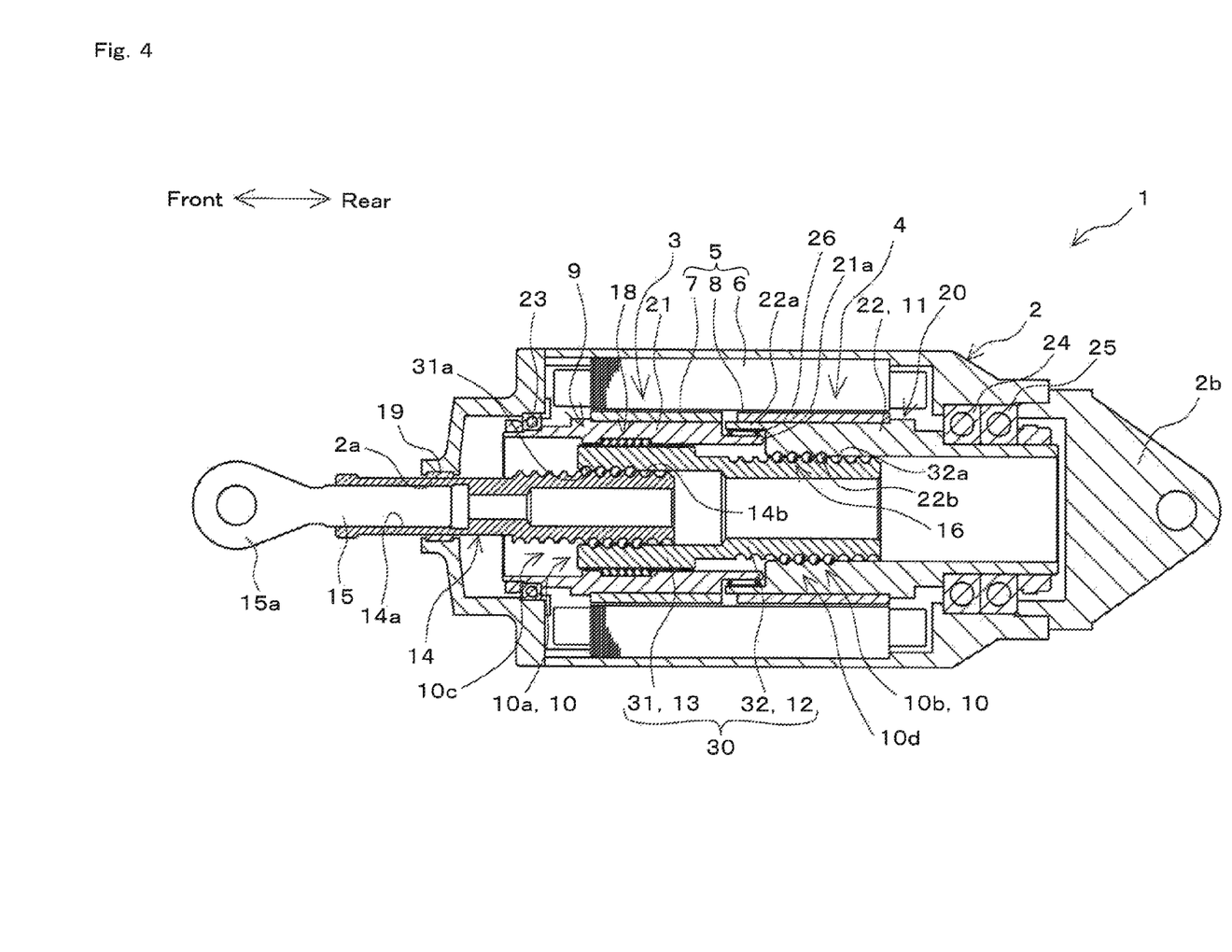
FIG. 4 is a diagram showing a state where the electromechanical actuator has operated from the state shown in FIG. 3 in a normal state.

Next, a basic operation of the electromechanical actuator 1 according to the present embodiment will be described. FIG. 3 described above is a cross-sectional view showing an exemplary state of the electromechanical actuator 1 before operating, and FIG. 4 is a diagram showing a state where the electromechanical actuator 1 has operated from the state shown in FIG. 3 in a normal state. During normal operation of the electromechanical actuator 1 (i.e., in a state where a jammed state has not occurred), the output portion 15 is displaced in the axial direction by the second screw mechanism 10b, as described below.

When operating the electromechanical actuator 1, the electric motor 5 is driven to rotate. That is to say, the pair of rotors 7 and 8 rotate with respect to the stator 6 due to a rotating magnetic field generated in the stator 6. At this time, since both the first rotor 7 and the second rotor 8 rotate with respect to the common stator 6, the first rotor 7 and the second rotor 8 (the first cylindrical member 21 and the second cylindrical member 22) rotate at roughly the same rotational speed. Then, the inner cylindrical member 30 is rotated by the first cylindrical member 21 via the ball spline mechanism 18, and accordingly the fourth screw portion 14 (the output portion 15) changes in the axial direction due to the rotational force of the inner cylindrical member 30 (the third screw portion 13). That is to say, upon the inner cylindrical member 30 being rotated by the first cylindrical member 21, the second screw mechanism 10b functions and the output portion 15 moves in the axial direction. The moving surface 102 can be thereby driven with respect to the wing 101. Note that, since a connected portion 15a provided on the tip side (front side) of the output portion 15 is connected to the moving surface 102, the output portion 15 moves in a sliding manner in the axial direction due to the rotation of the inner cylindrical member 30, without rotating with respect to the housing 2.

Operation of Electromechanical Actuator when in Jammed State

Figure 5:
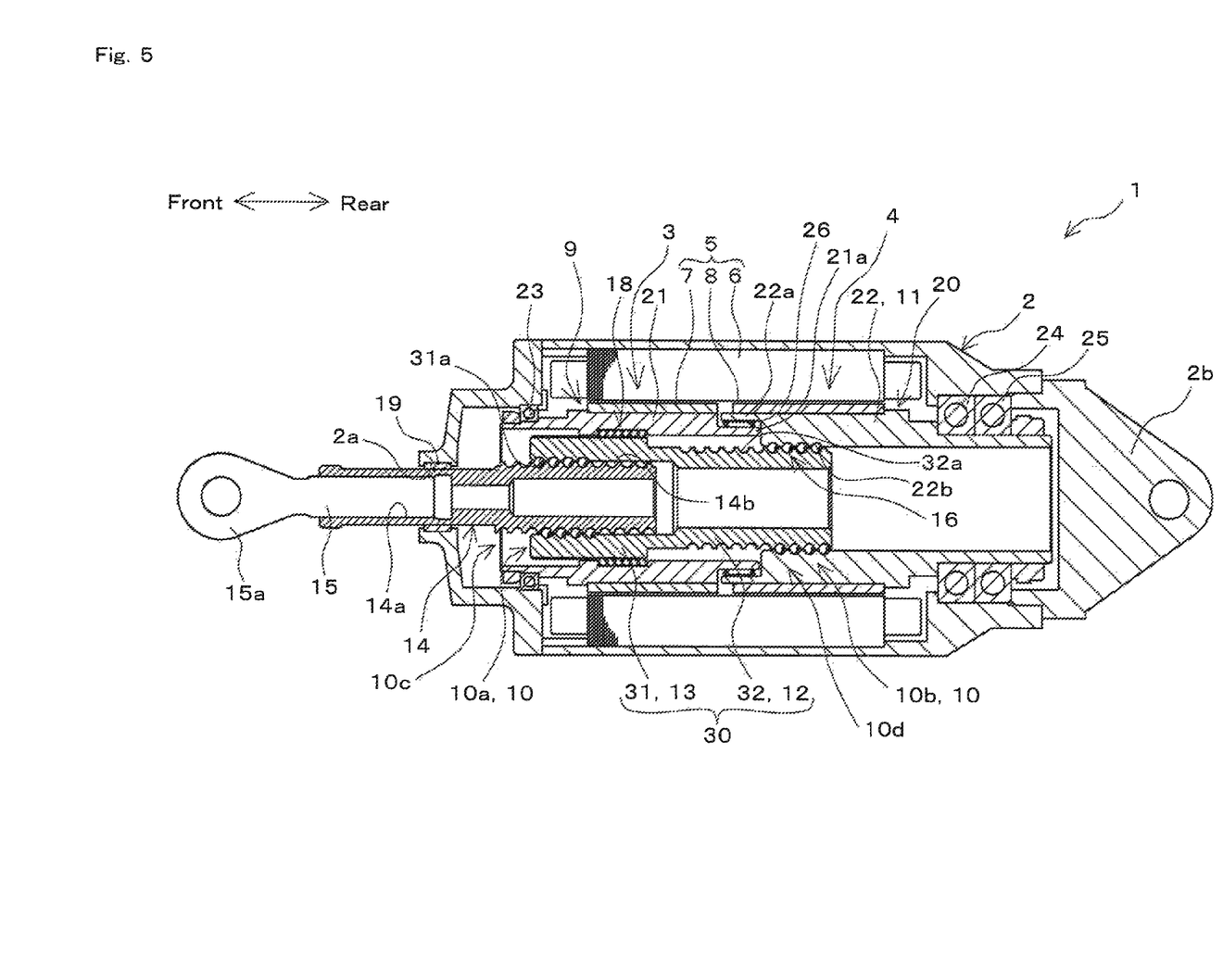
FIG. 5 is a diagram showing a state where the electromechanical actuator has operated from the state shown in FIG. 3 when in a jammed state.

Next, an operation of the electromechanical actuator 1 in the case where a jammed state occurs in the second screw mechanism 10b will be described. FIG. 5 is a diagram showing a state where the electromechanical actuator 1 has operated from the state shown in FIG. 3 when in a jammed state. As mentioned above, during normal operation of the electromechanical actuator 1, the output portion 15 is moved by the second screw mechanism 10b functioning. Accordingly, a jammed state is more likely to occur in the first screw mechanism 10a than in the second screw mechanism 10b. In this regard, with the electromechanical actuator 1 according to the present embodiment, the output portion 15 can be moved by the second screw mechanism 10b even if the first screw mechanism 10a stops functioning due to a jammed state. That is to say, the second screw mechanism 10b functions as an auxiliary screw mechanism for the first screw mechanism 10a that is mainly driven as the screw mechanism.

Specifically, during operation of the electromechanical actuator 1 or when the electromechanical actuator 1 starts to operate, if the first screw mechanism 10a enters a jammed state, the fourth screw portion 14 stops moving with respect to the inner cylindrical member 30. That is to say, a state is entered where the inner cylindrical member 30 and the fourth screw portion 14 are integrated with each other. In this case, the inner cylindrical member 30 cannot be rotated by the first cylindrical member 21.

At this time, in the electromechanical actuator 1 according to the present embodiment, the first rotor 7 cannot be driven to rotate by the stator 6, whereas the second rotor 8 continues to be driven to rotate by the stator 6. That is to say, the second rotor 8 (the second cylindrical member 22) rotates with respect to the inner cylindrical member 30 and the output portion 15 that cannot rotate with respect to the housing 2. As a result, the fourth screw portion 14 and the output portion 15 are moved in the axial direction together with the inner cylindrical member 30 that has entered a jammed state, due to the rotational force of the second cylindrical member 22 (the first screw portion 11). That is to say, if the first screw mechanism 10a enters a jammed state, the output portion 15 moves in the axial direction by the second screw mechanism 10b functioning. The moving surface 102 can thereby be driven with respect to the wing 101.

Effects

As described above, in the electromechanical actuator 1 according to the present embodiment, upon the electric motor 5 operating, the pair of rotors 7 and 8 are driven to rotate with respect to the common stator 6. That is to say, the pair of rotors 7 and 8 rotate at roughly the same speed. At this time, since the rotational force of the first rotor portion 3 is converted into thrust force and is transmitted to the output portion 15 by the first screw mechanism 10a, the output portion 15 moves in the axial direction and outputs the driving force. Note that, at this time, since the second rotor portion 4 and the second screw mechanism 10b rotate at roughly the same speed, the thrust force is substantially not transmitted from the second screw mechanism 10b to the output portion 15.

In the electromechanical actuator 1, even if a jammed state occurs in the first screw mechanism 10a (the third screw portion 13 and the fourth screw portion 14), the output portion 15 can be displaced in the axial direction by the second screw mechanism 10b (the first screw portion 11 and the second screw portion 12). Specifically, if a jammed state occurs in the third screw portion 13 and the fourth screw portion 14, the inner cylindrical member 30 cannot be rotated by the first rotor 7 to which the first cylindrical member 21 is fixed. However, on the other hand, the second rotor 8 to which the second cylindrical member 22 is fixed is rotated by the stator 6 regardless of the rotation of the first rotor 7. Then, the rotational force of the second cylindrical member 22 serving as the first screw portion 11 is transmitted to the inner cylindrical member 30 in which the second screw portion 12 is formed. As a result, the inner cylindrical member 30 and the fourth screw portion 14 that are integrated due to a jammed state can be moved back and forth in the axial direction by the first screw portion 11.

Accordingly, with the electromechanical actuator 1, even if the third screw portion 13 and the fourth screw portion 14 that are mainly used for moving the output portion 15 back and forth during normal operation enter a jammed state, the output portion 15 can be moved with respect to the housing 2 by the first screw portion 11 and the second screw portion 12. Moreover, the structure for moving the output portion 15 back and forth when in a jammed state as described above is realized with a relatively small and simple structure configured to include the pair of rotor portions 3 and 4 that are provided with respect to the common stator 6, the first screw mechanism 1*a*, the second screw mechanism 10*b*, and the like. For this reason, simplification and a reduction in the size of the structure of the electromechanical actuator 1 will be achieved.

Accordingly, with the electromechanical actuator 1, it is possible to provide an electromechanical actuator whose structure is simplified and made small, and in which, even if a jammed state occurs in one of the screw mechanisms, namely the screw mechanism 10*a*, the output portion 15 can be moved back and forth with respect to the housing 2 by the other screw mechanism, namely the screw mechanism 10*b*.

In the electromechanical actuator 1, upon the electric motor 5 operating during normal operation, the rotation member (the inner cylindrical member 30) having the sliding portion (the front portion 31) can be rotated by the first rotor portion 3. The rotational force of the rotation member that is thus rotated is converted into thrust force by the first conversion portion 10*c*, and is thereafter output to the output portion 15. Also, with the electromechanical actuator 1, if a jammed state occurs in the first screw mechanism 10*a*, the inner cylindrical member 30 can be moved in a sliding manner in the axial direction by the rotation of the second rotor portion 4, and the output portion 15 can be moved back and forth together with the inner cylindrical member 30.

With the electromechanical actuator 1, since the second screw mechanism 10*b* can be constituted by using two screw portions (the first screw portion 11 and the second screw portion 12), a specific configuration of the second screw mechanism 10*b* can be provided.

Also, with the electromechanical actuator 1, since the first screw mechanism 10*a* can be constituted by using two screw portions (the third screw portion 13 and the fourth screw portion 14), a specific configuration of the first screw mechanism 10*a* can be provided.

In the electromechanical actuator 1, as a result of provision of the bearing 26 between the first cylindrical member 21 and the second cylindrical member 22 that are arranged in series, the first cylindrical member 21 and the second cylindrical member 22 can be appropriately supported with respect to each other such that the first cylindrical member 21 and the second cylindrical member 22 can rotate with respect to each other.

In the electromechanical actuator 1, since the fourth screw portion 14 can be accommodated in the inner cylindrical member 30, the size of the electromechanical actuator 1 can be further reduced.

In the electromechanical actuator 1, since the front portion 31 of the inner cylindrical member 30 and the fourth screw portion 14 can be arranged so as to be aligned in the axial direction, the axial length of the electromechanical actuator 1 can be shortened.

In the electromechanical actuator 1, the output portion 15 can be linearly moved without providing a mechanism necessary for linearly moving the output portion 15 with respect to the housing 2 (i.e., a mechanism for supporting the output portion so as not to be able to rotate with respect to the housing and so as to be able to slide in the axial direction.

Although an embodiment of the present invention has been described above, the present invention is not limited to the above embodiment, and various modifications may be implemented within the scope recited in the claims. For example, the following modifications may be implemented.

(1) Although the screw channel of the third screw portion 13 is formed in the inner circumferential face of the inner cylindrical member 30, and the screw channel 14*b* of the fourth screw portion 14 is formed in the outer circumferential face of the fourth screw portion 14 in the present embodiment, this need not be the case. For example, the screw channel of the third screw portion may be formed in the outer circumferential face of the inner cylindrical member, and the screw channel of the fourth screw portion may be formed in the inner circumferential face of the fourth screw portion. In this case, it is also possible that the inner cylindrical member 30 provided as the rotation member is not formed in a cylindrical shape and the rotation member is formed in a circular column shape.

(2) Although the bearing 26 is provided between the first cylindrical member 21 and the second cylindrical member 22 in the above embodiment, this need not be the case, and this bearing 26 may be omitted.

(3) The above embodiment has been described regarding an exemplary mode in which the second screw mechanism 10*b* having the first screw portion 11 and the second screw portion 12 and the first screw mechanism 10*a* having the third screw portion 13 and the fourth screw portion 14 each have a configuration of a ball screw mechanism. However, this need not be the case. That is to say, a mode may also be implemented in which the screw mechanisms 10*a* and 10*b* each have a configuration other than a ball screw mechanism. For example, a screw mechanism may be implemented that has a configuration in which the first screw portion and the second screw portion, or the third screw portion and the fourth screw portion screw with each other. Alternatively, a mode may be implemented in which the screw mechanism having the first screw portion and the second screw portion or having the third screw portion and the fourth screw portion has a configuration of a roller screw mechanism. In the case of a roller screw mechanism, a plurality of screw-shaped roller shafts provided with helical channels on their outer circumferences will be rotatably installed between the first screw portion and the second screw, or between the third screw portion and the fourth screw portion.

(4) Although the output portion 15 is connected to the fourth screw portion 14 in the above embodiment, this need not be the case, and the output portion may be provided integrally with the fourth screw portion.

The present invention is widely applicable to an electromechanical actuator that has a screw mechanism, converts rotational driving force which is output by an electric motor into linear driving force and outputs the converted driving force. The present invention is not limited to the above embodiment, and all modifications, applications, and equivalents thereof that fall within the claims, for which modifications and applications would become naturally apparent by reading and understanding the present specification, are intended to be embraced in the claims.

What is claimed is:

1. An electromechanical actuator comprising:
an electric motor having a first rotor portion and a second rotor portion that serve as a pair of rotor portions, which are each formed in a cylindrical shape, are arranged within a cylindrical stator fixed to a housing, in an axial direction of the stator, and can relatively rotate with respect to each other;
an output portion that outputs driving force; and
a jam relief mechanism having a first conversion portion that has a first screw mechanism capable of converting rotational force of the first rotor portion into thrust force and moving the output portion back and forth, a sliding support mechanism provided between the first rotor portion and the first conversion portion, the sliding support mechanism supporting the first conversion portion so as to be able to be displaced in an axial direction with respect to the first rotor portion and being able to transmit the rotational force of the first rotor portion to the first conversion portion, and a second conversion portion that has a second screw mechanism which converts rotational force of the second rotor portion into thrust force and moves the output portion back and forth together with the first conversion portion.

2. The electromechanical actuator according to claim 1, further comprising a rotation member that moves the output portion back and forth by rotating together with the first rotor portion, and also moves the output portion back and forth together with the first conversion portion by the second rotor portion rotating, wherein the rotation member has a sliding portion that is accommodated in the first rotor portion so as to be coaxial with the first rotor portion, the sliding portion being unable to rotate with respect to the first rotor portion and being able to slide in the axial direction by means of the sliding support mechanism.

3. The electromechanical actuator according to claim 2, wherein the rotation member is provided with a second screw portion that is integrated with the sliding portion so as to be coaxial with the sliding portion, can relatively rotate with respect to a first screw portion formed in an inner circumferential portion of the second rotor portion, around an axis of the first screw portion, and can be relatively displaced in the axial direction with respect to the first screw portion, and the second screw mechanism has the first screw portion and the second screw portion.

4. The electromechanical actuator according to claim 2, wherein the first screw mechanism has a third screw portion in which a screw channel is formed, and a fourth screw portion to which the output portion is connected or in which the output portion is provided, the fourth screw portion being attached so as to be able to relatively rotate around an axis of the third screw portion and being able to be relatively displaced in the axial direction with respect to the third screw portion.

5. The electromechanical actuator according to claim 4, wherein the rotation member is formed in a cylindrical shape, and the fourth screw portion is accommodated within the rotation member.

6. The electromechanical actuator according to claim 5, wherein the fourth screw portion is arranged radially inward of the sliding portion.

7. The electromechanical actuator according to claim 1, further comprising a bearing portion that is provided between the pair of rotor portions and allows the pair of rotor portions to rotate with respect to each other.

8. The electromechanical actuator according to claim 1, wherein the output portion is provided with a connected portion with which rotation of the output portion with respect to the housing is restricted by the connected portion being connected to equipment driven by the driving force that is output by the output portion.

* * * * *